(12) United States Patent
McGolden

(10) Patent No.: US 12,534,672 B2
(45) Date of Patent: Jan. 27, 2026

(54) GASIFIER WITH A REACTION ZONE AND A COOLING ZONE WITH ALTERNATELY FLIGHTED AUGERS AND PADDLES

(71) Applicant: McGolden, LLC, Evansville, IN (US)

(72) Inventor: Michael McGolden, Evansville, IN (US)

(73) Assignee: McGolden, LLC, Evansville, IN (US)

( * ) Notice: Subject to any disclaimer, the term of this patent is extended or adjusted under 35 U.S.C. 154(b) by 190 days.

(21) Appl. No.: 18/470,887

(22) Filed: Sep. 20, 2023

(65) Prior Publication Data
US 2024/0093096 A1  Mar. 21, 2024

Related U.S. Application Data

(60) Provisional application No. 63/408,376, filed on Sep. 20, 2022.

(51) Int. Cl.
*C10B 57/10* (2006.01)
*C10B 49/04* (2006.01)
(Continued)

(52) U.S. Cl.
CPC .............. *C10B 57/10* (2013.01); *C10B 49/04* (2013.01); *C10J 3/30* (2013.01); *C10J 3/723* (2013.01);
(Continued)

(58) Field of Classification Search
CPC .. C10B 49/04; C10B 57/10; C10J 3/30; C10J 3/723
See application file for complete search history.

(56) References Cited

U.S. PATENT DOCUMENTS 4,123,332 A * 10/1978 Rotter ................ C10B 7/10
202/137
4,764,185 A  8/1988 Mayer
(Continued)

FOREIGN PATENT DOCUMENTS

CH    703513 B1   9/2014
CN   101245250 A  8/2008
(Continued)

OTHER PUBLICATIONS

Examination Report in European Patent Application No. 13751926.0, dated Mar. 2, 2017.
(Continued)

*Primary Examiner* — Jonathan Miller
(74) *Attorney, Agent, or Firm* — Ryan T. Grace; Advent, LLP

(57) ABSTRACT

A gasification system for receiving biomass feedstock and gasifying the biomass feedstock to produce char can include a reaction zone for receiving biomass fuel and a cooling zone for receiving char from the reaction zone. Together, the reaction zone and the cooling zone include a reaction chamber and a cooling chamber defining a live floor and a gas recovery volume above the live floor. The reaction zone and the cooling zone also include augers arranged side-by-side on the live floor, where each auger has helical flighting. The helical flighting of each auger can be turned in an opposing direction to each adjacent auger. Each auger can also include paddles intermittently interrupting the helical flighting for turning over the biomass fuel. The augers can be driven to pull the biomass fuel from a first end to a second end of the reaction chamber and the cooling chamber.

19 Claims, 16 Drawing Sheets

(51) Int. Cl.
*C10J 3/30* (2006.01)
*C10J 3/72* (2006.01)

(52) U.S. Cl.
CPC .... *C10J 2200/152* (2013.01); *C10J 2200/158* (2013.01); *C10J 2300/0909* (2013.01); *C10J 2300/0916* (2013.01); *C10J 2300/0956* (2013.01)

(56) References Cited

U.S. PATENT DOCUMENTS

| | | | | |
|---|---|---|---|---|
| 4,908,104 | A * | 3/1990 | Loomans | C10B 53/00 201/35 |
| 5,024,820 | A | 6/1991 | Coutiere | |
| 5,094,669 | A | 3/1992 | Herbert et al. | |
| 5,096,463 | A | 3/1992 | Beierle et al. | |
| 5,151,159 | A * | 9/1992 | Wolfe | C10J 3/007 202/241 |
| 5,589,599 | A * | 12/1996 | McMullen | C10B 53/00 210/769 |
| 5,601,692 | A | 2/1997 | Rinker et al. | |
| 5,720,165 | A | 2/1998 | Rizzie et al. | |
| 6,485,296 | B1 | 11/2002 | Bender et al. | |
| 6,619,214 | B2 * | 9/2003 | Walker | F23G 5/444 110/255 |
| 6,754,978 | B1 * | 6/2004 | Adams | F26B 17/205 210/768 |
| 7,832,343 | B2 * | 11/2010 | Walker | F23G 5/0276 110/229 |
| 8,328,993 | B2 * | 12/2012 | Feerer | F23G 5/0273 202/229 |
| 8,419,902 | B2 * | 4/2013 | Feerer | F23G 5/02 48/119 |
| 8,669,404 | B2 * | 3/2014 | Shulenberger | C10G 2/30 585/242 |
| 9,045,693 | B2 * | 6/2015 | Wolfe | F23G 5/0273 |
| 9,605,210 | B2 * | 3/2017 | Tucker | C10B 53/00 |
| 9,724,844 | B1 * | 8/2017 | Kowalczyk | B29B 7/488 |
| 10,233,393 | B2 * | 3/2019 | Oluwaseun | C10B 23/00 |
| 10,731,082 | B2 * | 8/2020 | Tenore | C10B 31/08 |
| 11,407,945 | B2 * | 8/2022 | Shibata | F27B 9/14 |
| 11,613,705 | B2 * | 3/2023 | McGolden | F23G 5/027 202/150 |
| 11,773,330 | B2 * | 10/2023 | Tenore | B01J 7/00 202/118 |
| 2004/0107638 | A1 | 6/2004 | Graham et al. | |
| 2007/0186829 | A1 * | 8/2007 | Cole | C10B 53/00 110/229 |
| 2008/0209807 | A1 | 9/2008 | Tsangaris et al. | |
| 2009/0007484 | A1 | 1/2009 | Smith | |
| 2010/0101141 | A1 | 4/2010 | Shulenberger et al. | |
| 2010/0223846 | A1 | 9/2010 | Yang et al. | |
| 2011/0114144 | A1 * | 5/2011 | Green | C10B 47/44 201/4 |
| 2011/0232191 | A1 | 9/2011 | Diebold et al. | |
| 2011/0258914 | A1 | 10/2011 | Banasiak et al. | |
| 2013/0098750 | A1 * | 4/2013 | Nickerson | C02F 11/10 201/14 |
| 2014/0332363 | A1 * | 11/2014 | McGolden | F23G 5/027 202/150 |
| 2018/0010049 | A1 * | 1/2018 | Tenore | B01D 53/002 |
| 2020/0369964 | A1 * | 11/2020 | Tenore | C10B 53/07 |
| 2022/0089954 | A1 * | 3/2022 | Shibata | C10B 21/00 |
| 2023/0348789 | A1 * | 11/2023 | McGolden | F23J 1/02 |

FOREIGN PATENT DOCUMENTS

| | | |
|---|---|---|
| CN | 201348276 Y | 11/2009 |
| CN | 101781585 A | 7/2010 |
| CN | 201952404 U | 8/2011 |
| CN | 201999893 U | 10/2011 |
| EP | 1312662 A2 | 5/2003 |
| JP | 2006083293 A | 3/2006 |
| JP | 2006335956 A | 12/2006 |
| JP | 2014005110 A | 1/2014 |
| WO | 2009020442 A1 | 2/2009 |
| WO | 2009124359 A1 | 10/2009 |
| WO | 2010128055 A1 | 11/2010 |
| WO | 2013126211 A1 | 8/2013 |

OTHER PUBLICATIONS

Extended European Search Report for Patent Application No. 13751926.0, dated Aug. 20, 2015.
First Office Action in China for Patent Application No. 201380008372.2 dated Sep. 25, 2015.
International Search Report and Written Opinion for Application No. PCT/US2013/024870, dated Jun. 2, 2013.
International Search Report and Written Opinion from PCT/US2023/033250, dated Jan. 16, 2024.
Second Office Action in China for Patent Application No. 201380008372.2, dated May 20, 2016.
Third Office Action in China for Patent Application No. 201380008372.2, dated Nov. 9, 2016.

* cited by examiner

GASIFIER WITH A REACTION ZONE AND A COOLING ZONE WITH ALTERNATELY FLIGHTED AUGERS AND PADDLES

CROSS-REFERENCE TO RELATED APPLICATIONS

The present application claims the benefit under 35 U.S.C. § 119(e) of U.S. Provisional Application Ser. No. 63/408,376, filed Sep. 20, 2022, and titled "GASIFIER WITH A REACTION ZONE AND A COOLING ZONE WITH ALTERNATELY FLIGHTED AUGERS AND PADDLES," which is herein incorporated by reference in its entirety.

BACKGROUND

"Gasification" refers to processes by which biomass or other carbonaceous fuel materials are converted into gases.

DRAWINGS

The Detailed Description is described with reference to the accompanying figures. The use of the same reference numbers in different instances in the description and the figures may indicate similar or identical items.

Figure 3:
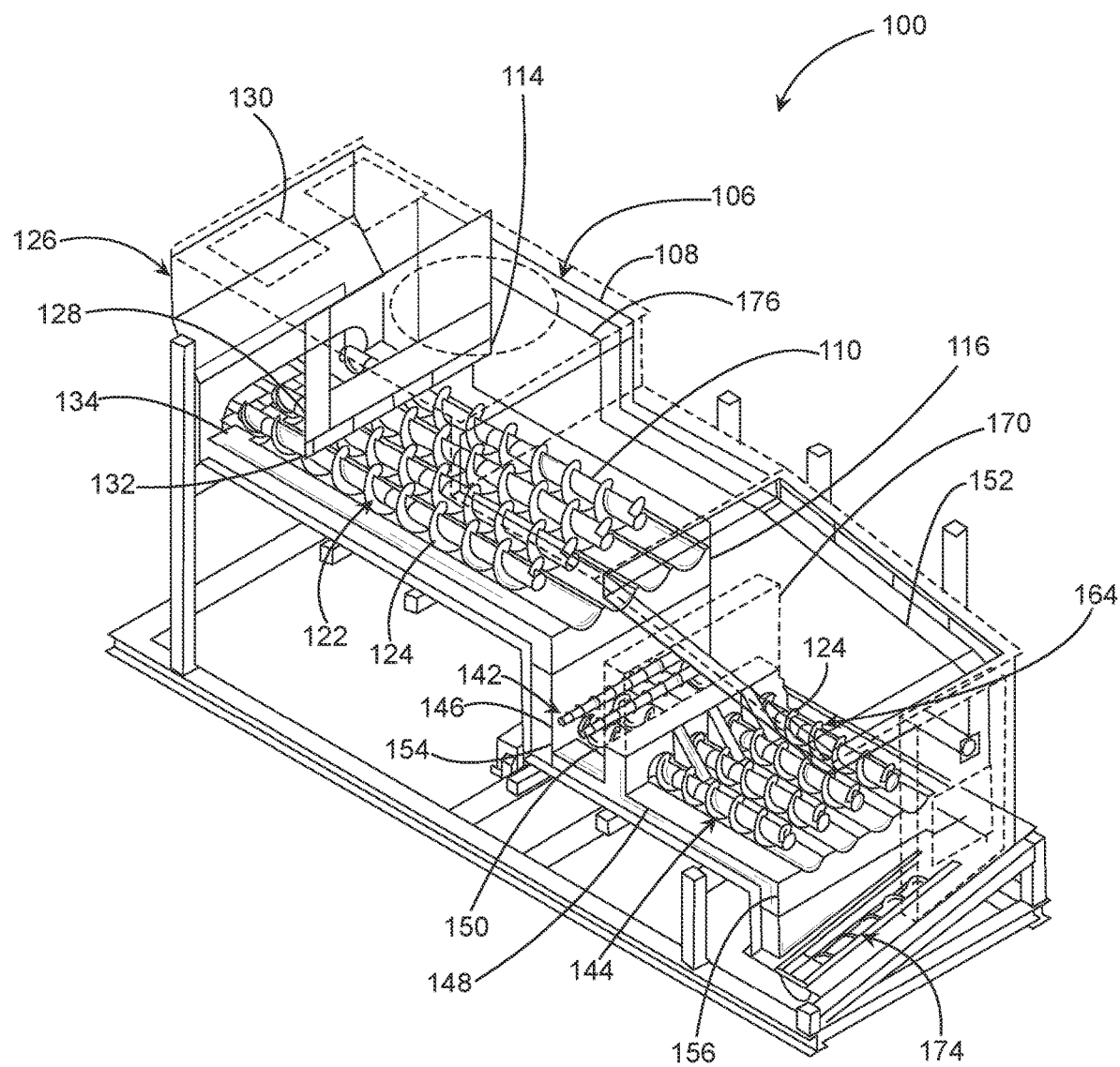
FIG. 3 is a perspective view illustrating a gasification system including a conditioning zone, a reaction zone, a reaction zone wall, a cooling zone, and a char removal auger in accordance with example embodiments of the present disclosure.
Figure 4:
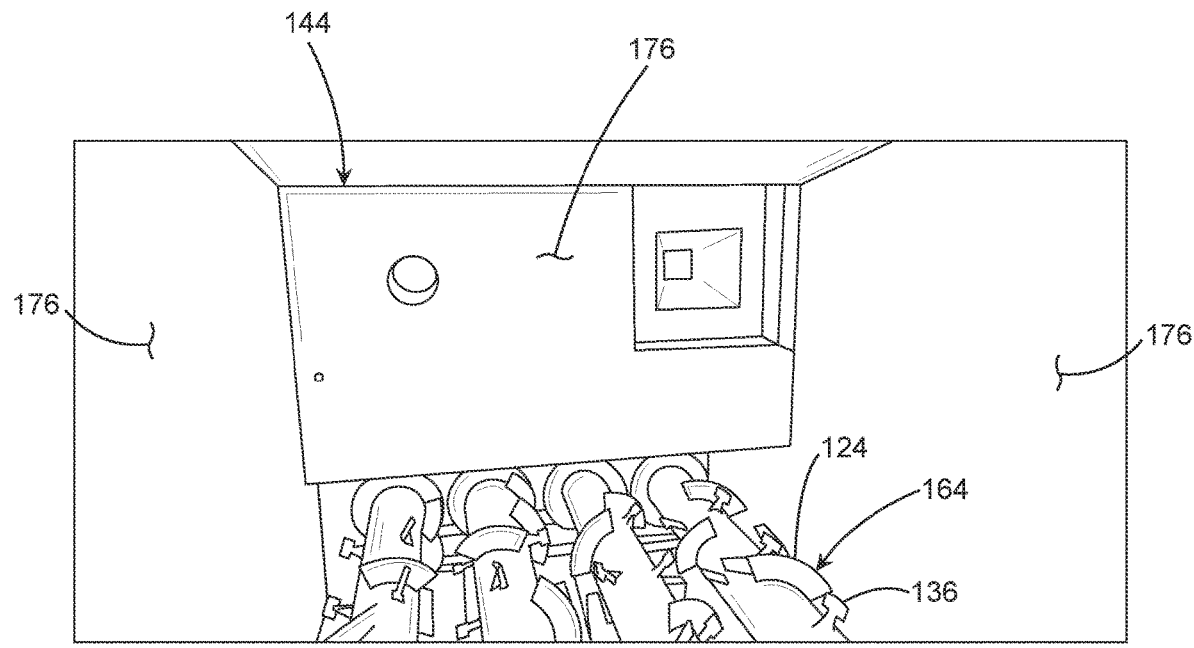
FIG. 4 is a partial perspective view illustrating augers for a gasification system, such as the gasification system illustrated in FIG. 3, in accordance with example embodiments of the present disclosure.
Figure 5:
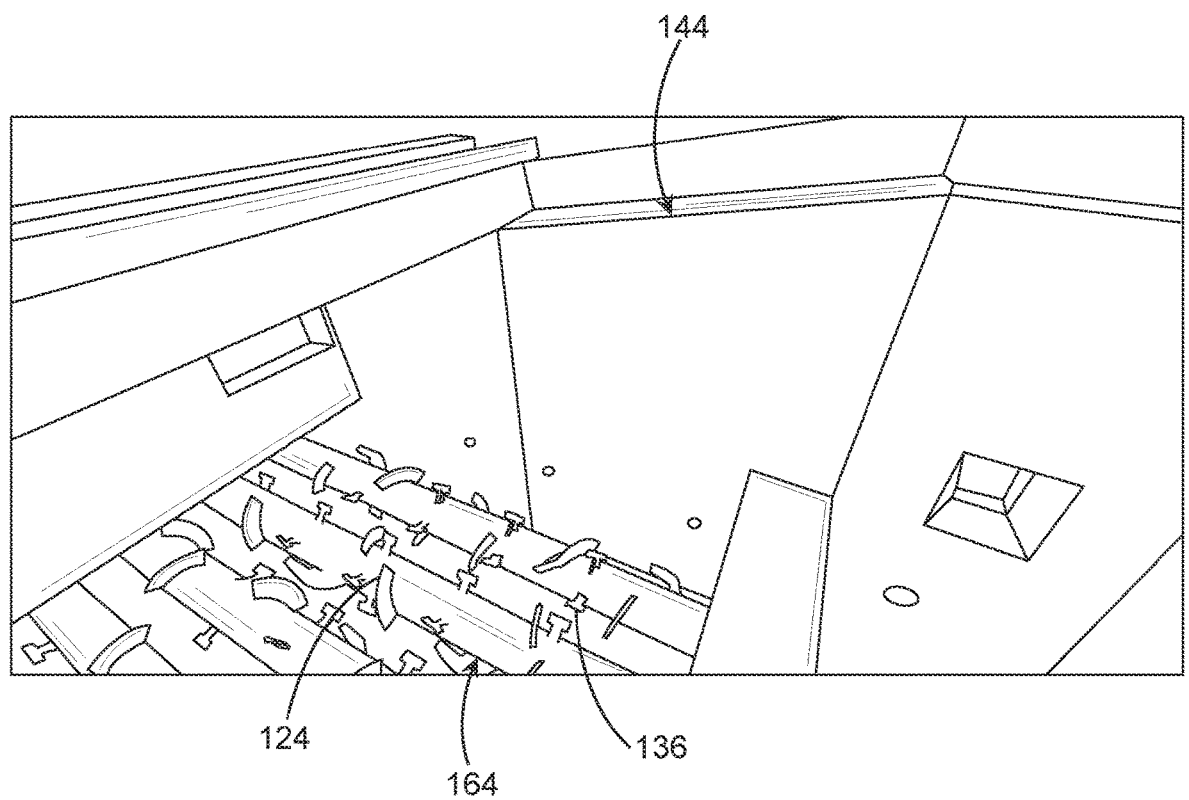
FIG. 5 is another partial perspective view of the augers illustrated in FIG. 4.
Figure 6:
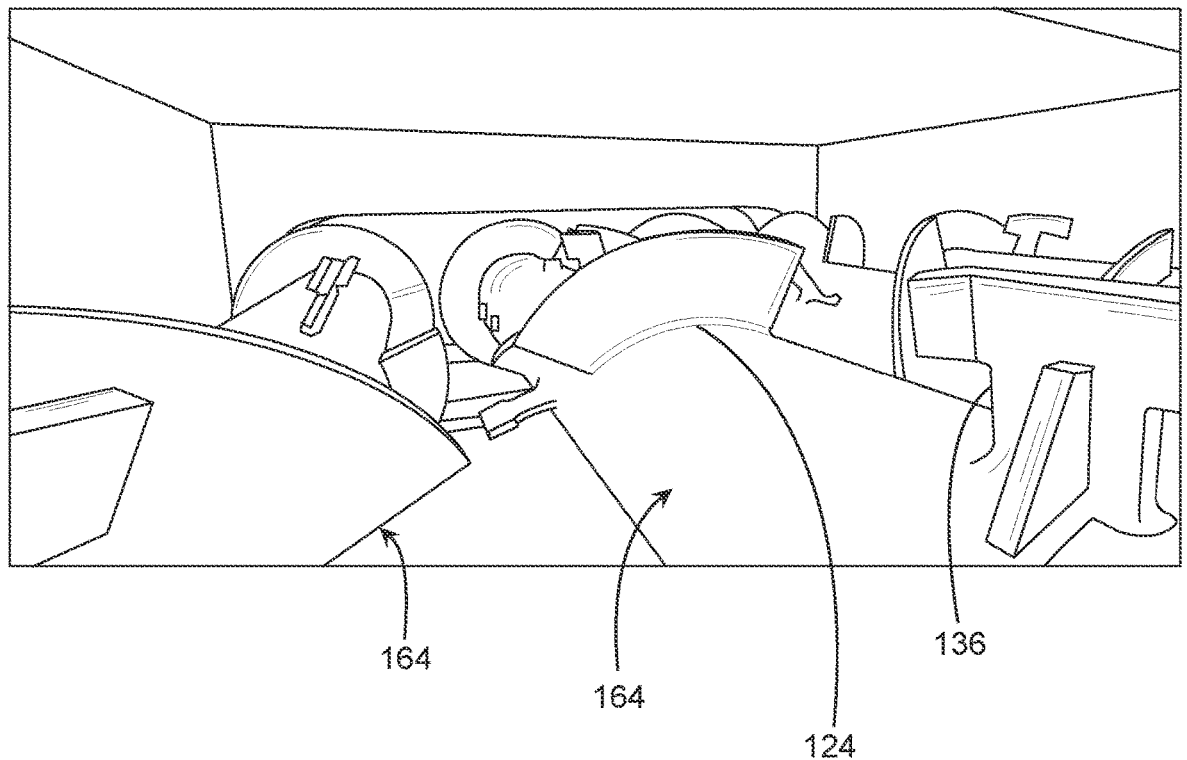
FIG. 6 is a further partial perspective view of the augers illustrated in FIG. 4.
Figure 7:
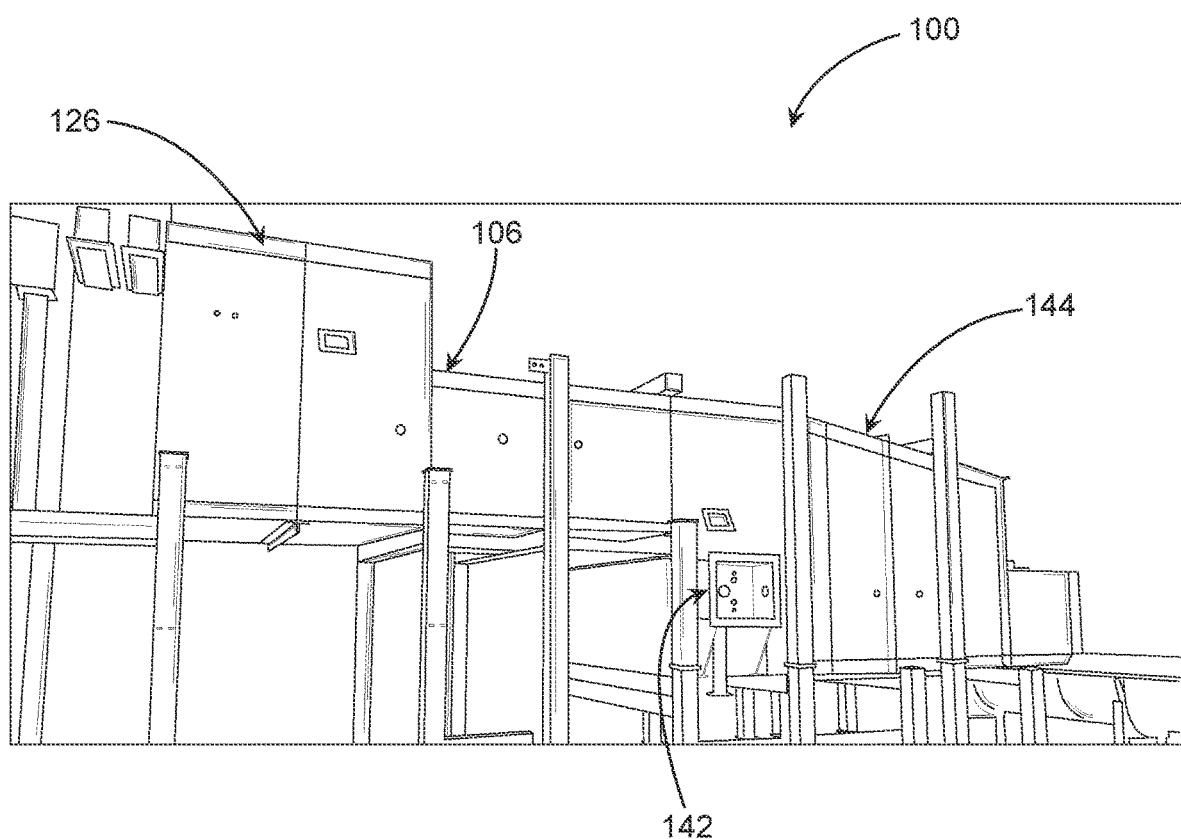
FIG. 7 is a perspective view illustrating a conditioning chamber, a reaction chamber, and a cooling chamber for a gasification system, such as the gasification system illustrated in FIG. 3, in accordance with example embodiments of the present disclosure.
Figure 8:
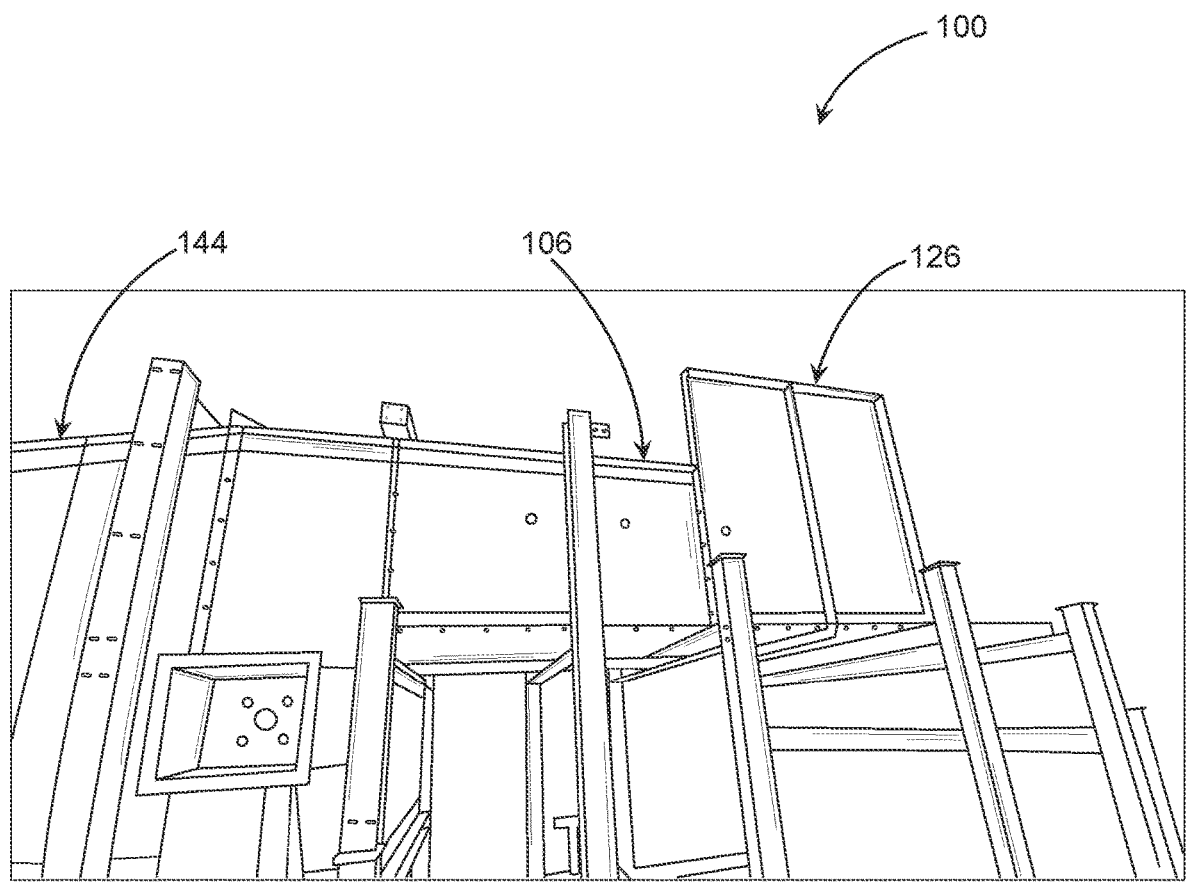
FIG. 8 is another perspective view of the conditioning chamber, the reaction chamber, and the cooling chamber illustrated in FIG. 7.
Figure 9:
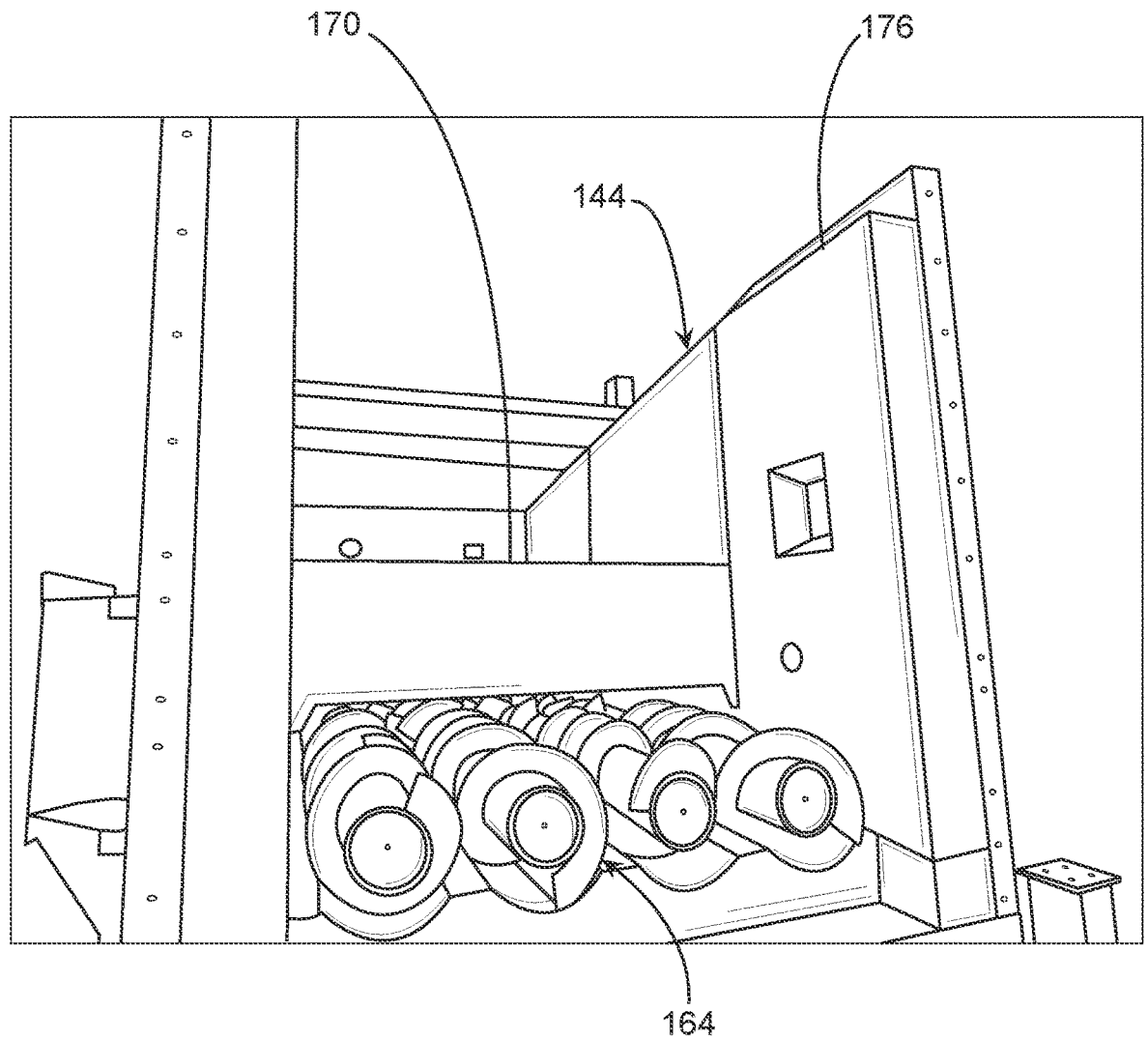
FIG. 9 is a partial perspective view illustrating a reaction zone, a reaction zone wall, and a cooling zone for a gasification system, such as the gasification system illustrated in FIG. 3, where the reaction zone wall is positioned on refractory walls in accordance with example embodiments of the present disclosure.
Figure 10:
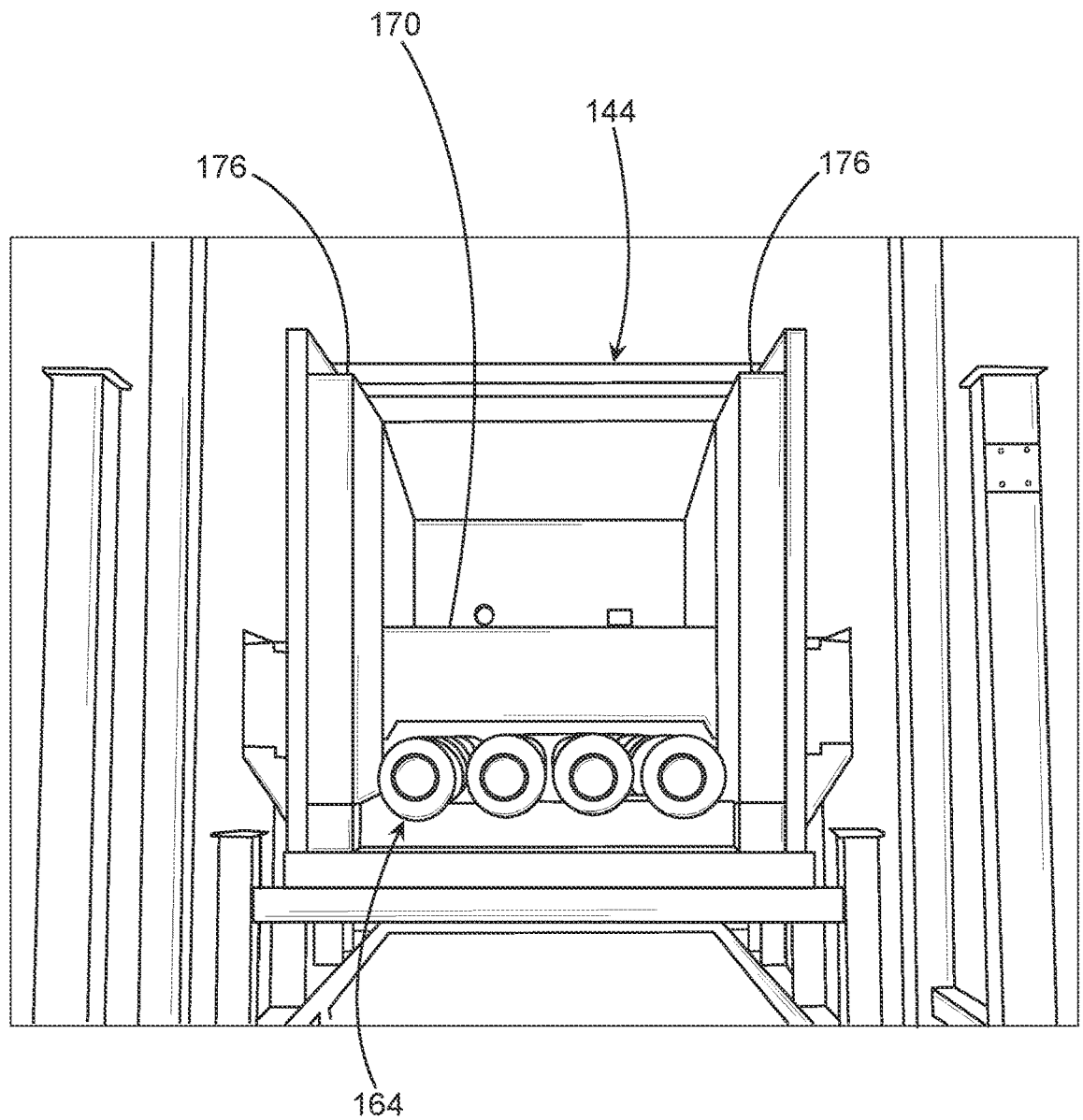
FIG. 10 is another partial perspective view of the reaction zone, the reaction zone wall, and the cooling zone illustrated in FIG. 9.
Figure 11:
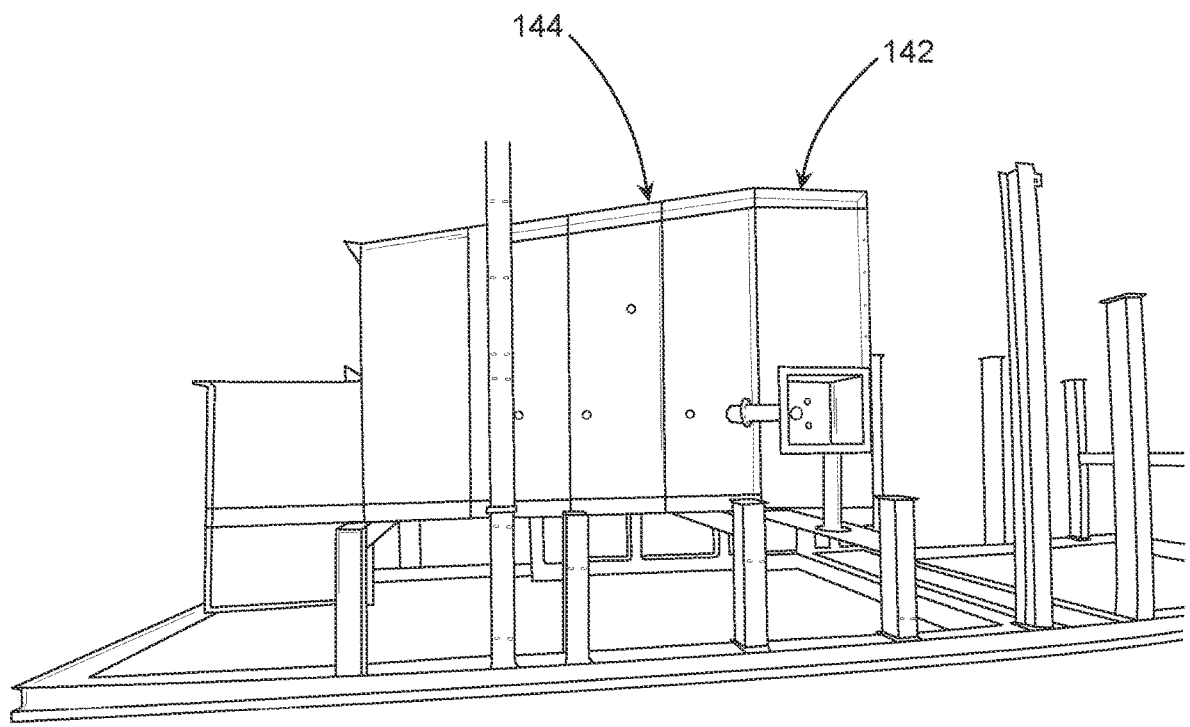

FIG. 11 is a partial perspective view illustrating a reaction chamber and a cooling chamber for a gasification system, such as the gasification system illustrated in FIG. 3, where the reaction chamber and the cooling chamber include augers arranged side-by-side on a live floor, where the side-by-side augers extend over a char removal auger, and where drive shafts of the augers are shown extending from the reaction chamber and the cooling chamber in accordance with example embodiments of the present disclosure.

Figure 12:
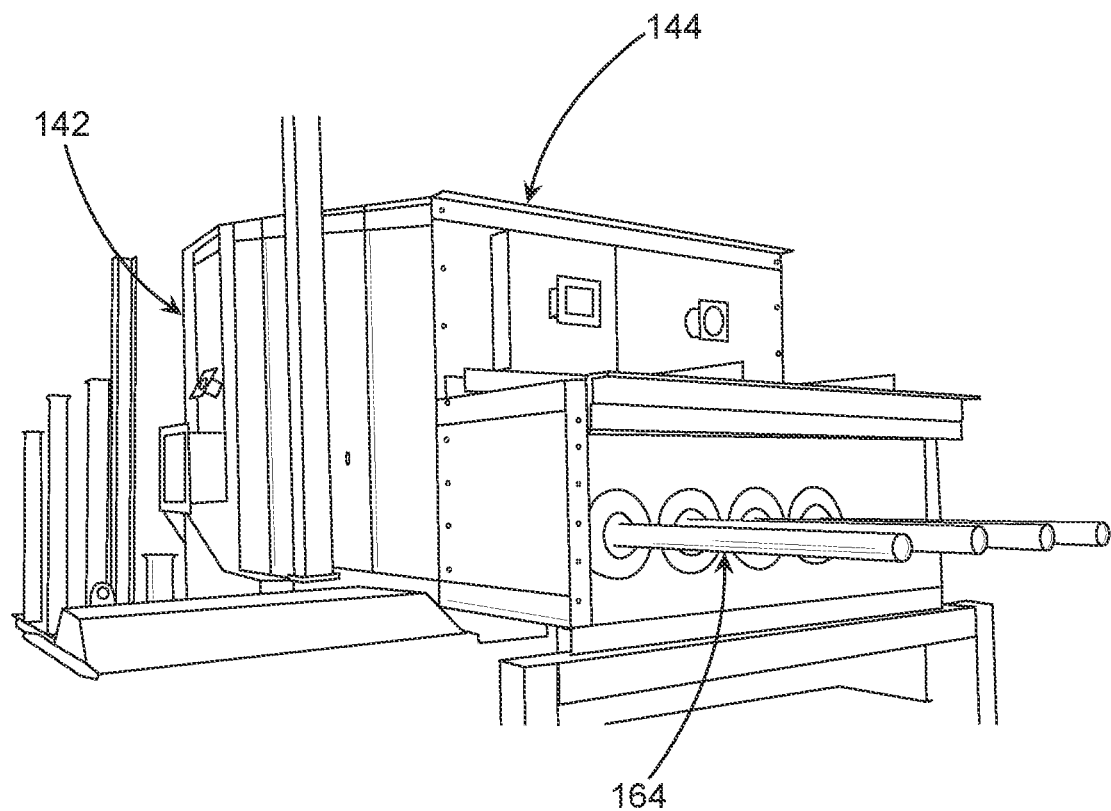

FIG. 12 is another partial perspective view of the reaction chamber and the cooling chamber and the drive shafts illustrated in FIG. 11.

Figure 13:
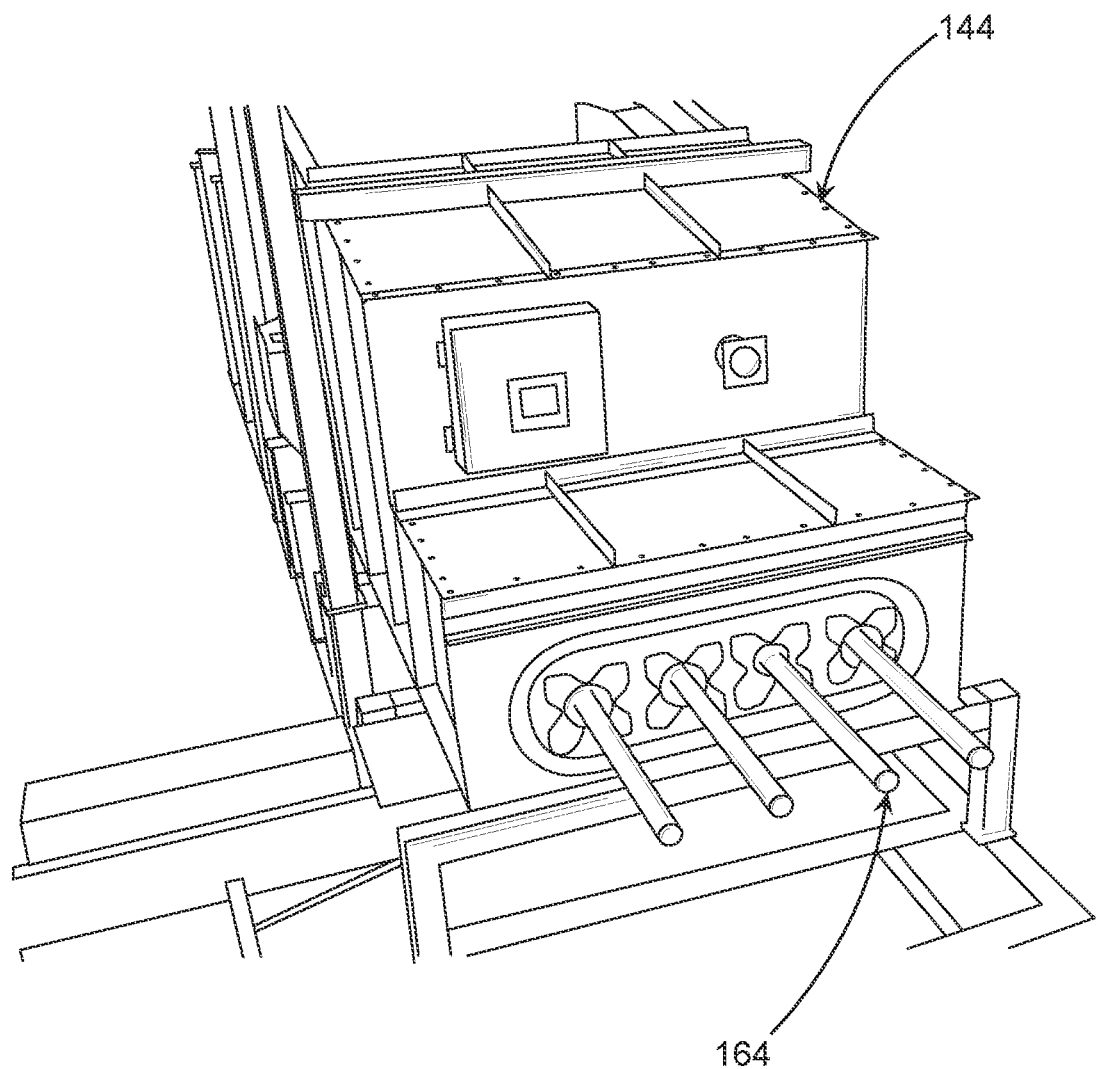

FIG. 13 is a further partial perspective view of the reaction chamber and the cooling chamber and the drive shafts illustrated in FIG. 11, further illustrating bearings for the drive shafts.

Figure 14:
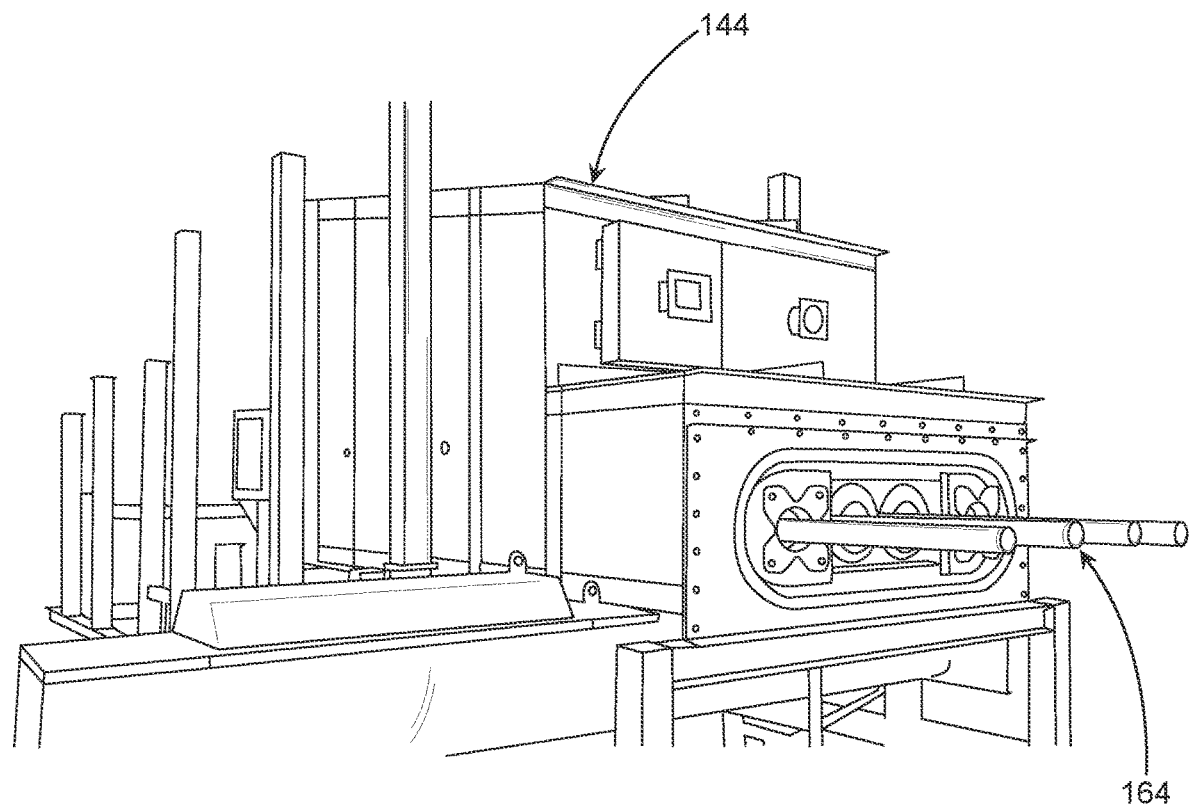

FIG. 14 is a further partial perspective view of the reaction chamber and the cooling chamber, the drive shafts, and the bearings illustrated in FIG. 13.

Figure 15:
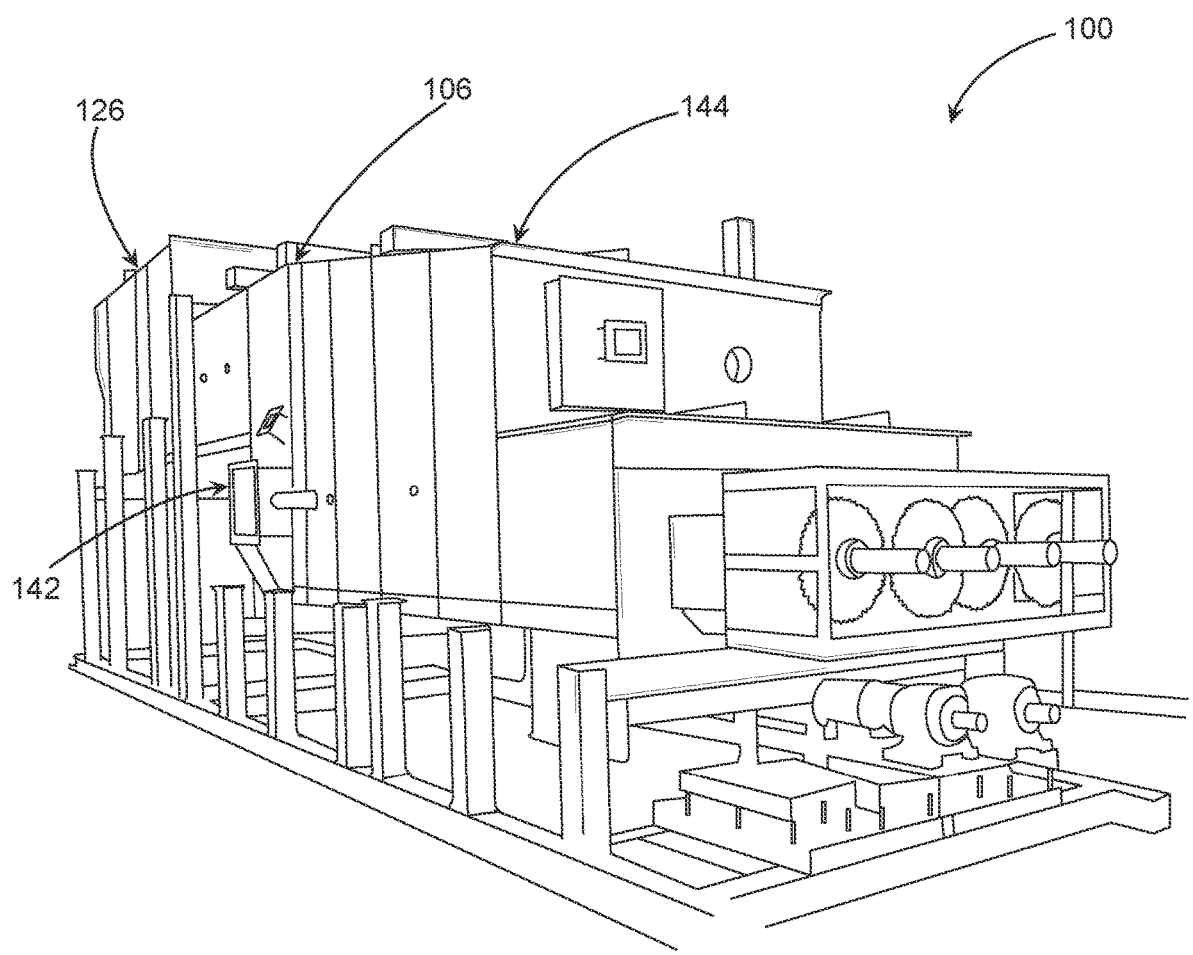

FIG. 15 is another partial perspective view of the reaction chamber and the cooling chamber and the drive shafts illustrated in FIG. 13. further illustrating drive mechanisms for the drive shafts.

Figure 16:
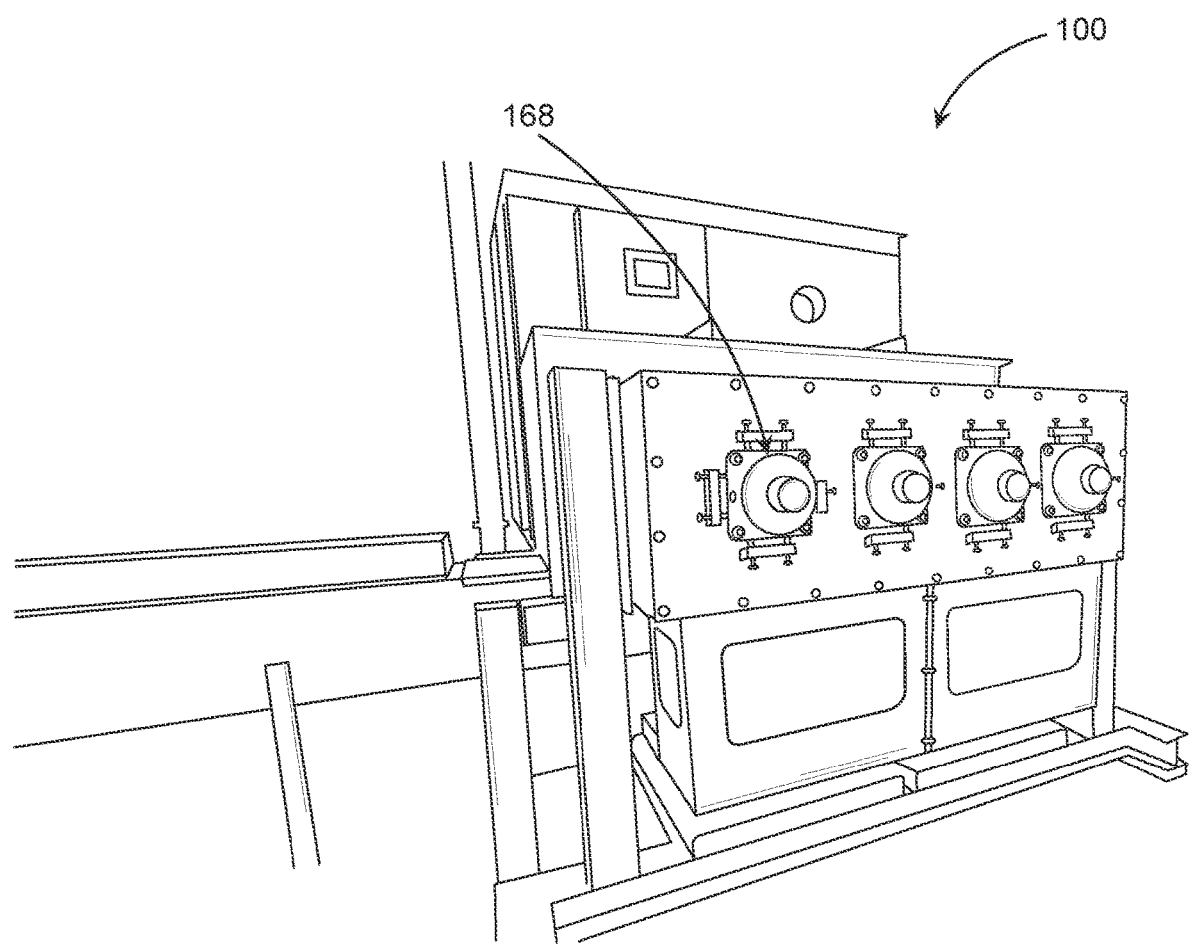

FIG. 16 is a further partial perspective view of the reaction chamber and the cooling chamber, the drive shafts and the drive mechanisms illustrated in FIG. 15.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete and will fully convey the scope.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

Before describing in detail embodiments that are in accordance with the systems and methods disclosed herein, it should be observed that embodiments include combinations of method steps and/or system components. Accordingly, the system components and method steps have been represented where appropriate by conventional symbols in the drawings, showing only those specific details that are pertinent to understanding the embodiments of the systems and methods disclosed herein so as not to obscure the disclosure with details that will be readily apparent to those of ordinary skill in the art having the benefit of the description herein.

In the following description, it is understood that terms such as "first," "second," "top," "bottom," "up," "down," and the like, are words of convenience and are not to be construed as limiting terms.

There have been a number of challenges when dealing with oxygen-starved gasification that evolved around the material handling and crusting or agglomerate formation in certain reaction zones of the gasifier design. Conventional gasification units have had limited success with high ash materials as they tend to form agglomerate (crusting or clinker formation) at lower temperatures than traditional woody biomass systems. Biochar is the ash byproduct of the gasification process. While ash has been used as a fertilizer for many years, the benefits of leaving carbon in the ash has only recently been established.

Accordingly, there is a need for a system and method of producing energy from biomass that is designed to address these operational issues as well as produce a marketable "BioChar." There is a further need for a biomass gasification system useable with high ash feedstocks.

The general principle is that, by controlling the air and biomass movement through the unit, higher or lower levels of carbon in the ash may be developed and maximize the value of the ash as both a fertilizer and/or method of holding carbon in the soil for long periods of time.

The present system is particularly well suited for on-site heat production as part of a larger facility. However, it is conceivable that the present system could be used to utilize high ash biomass as an energy source for electricity production.

Figure 1:
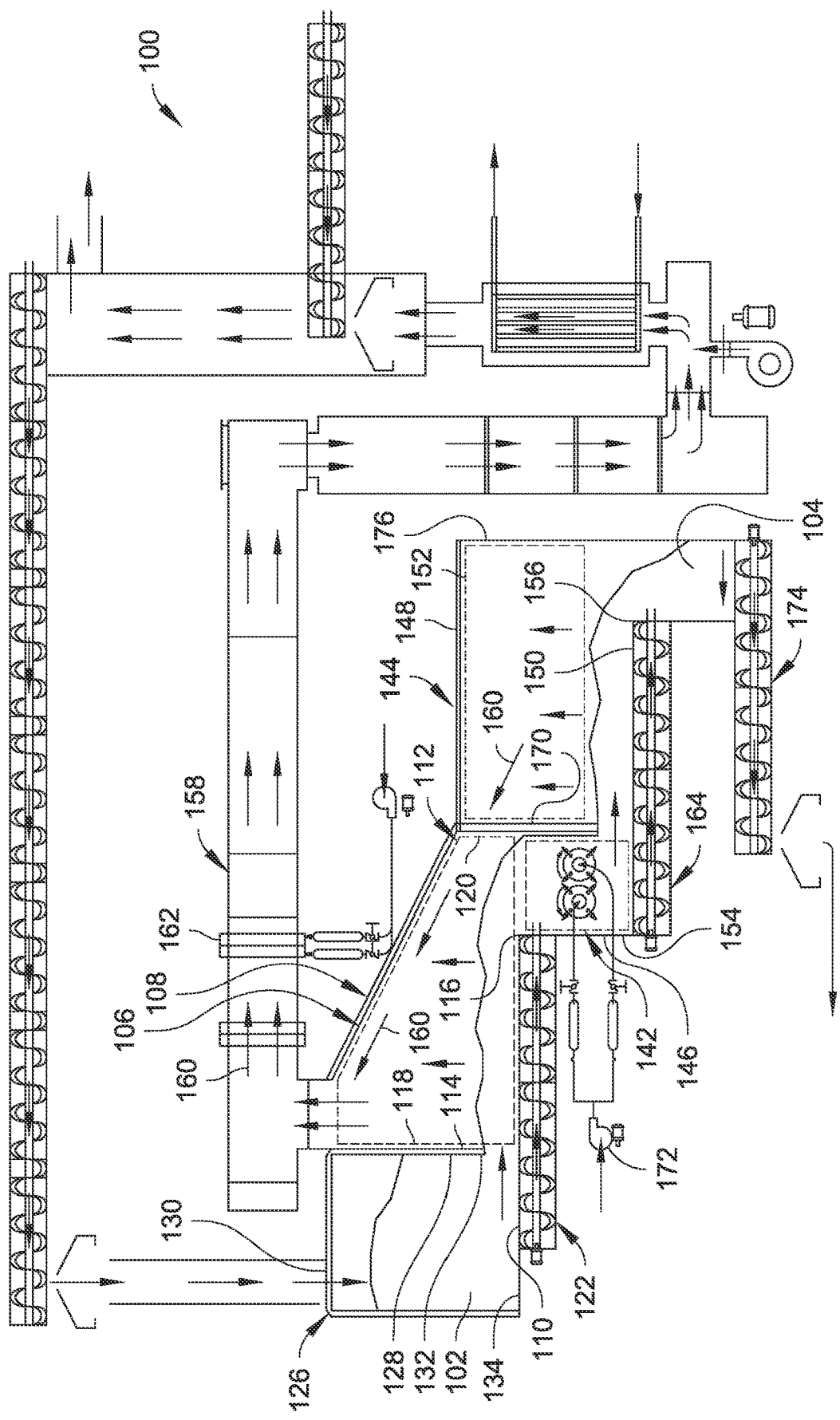
FIG. 1 is a diagrammatic illustration of a system including a conditioning zone, a reaction zone, a reaction zone wall, a cooling zone, and a char removal auger.

Referring to FIG. 1, fuel 102 is introduced to a dryer for conditioning. Conditioning includes, but is not limited to, pre-heating and/or drying. While generally any biomass material may be used as the fuel 102, the present system is most advantageous in its handling of high ash feedstocks such as animal manure (see also U.S. patent application Ser. No. 14/356,977 titled "Method and System for Gasification of Biomass," the contents of which are hereby incorporated by reference thereto).

Biomass fuel generally contains large amounts of moisture. There are a number of methods for removing moisture. In some embodiments, a commercial dryer may be added to the system. This will not be required with all biomass fuels. Standard equipment would also be used to introduce material to the front end of the gasification process.

After conditioning, the fuel 102 may be introduced and moved with augers through various zones. The speed of these augers is controlled so that the material is taken away at the same speed that it is introduced. This not only produces a continuous process but also allows for fine control of the rate and extent of reaction through the various zones. With this process, the amount of the fixed carbon that will be left in the char 104 may be adjusted by varying the feedstock feed rate as well as the feed rates of air as it is added in the various zones of the process.

Figure 2:
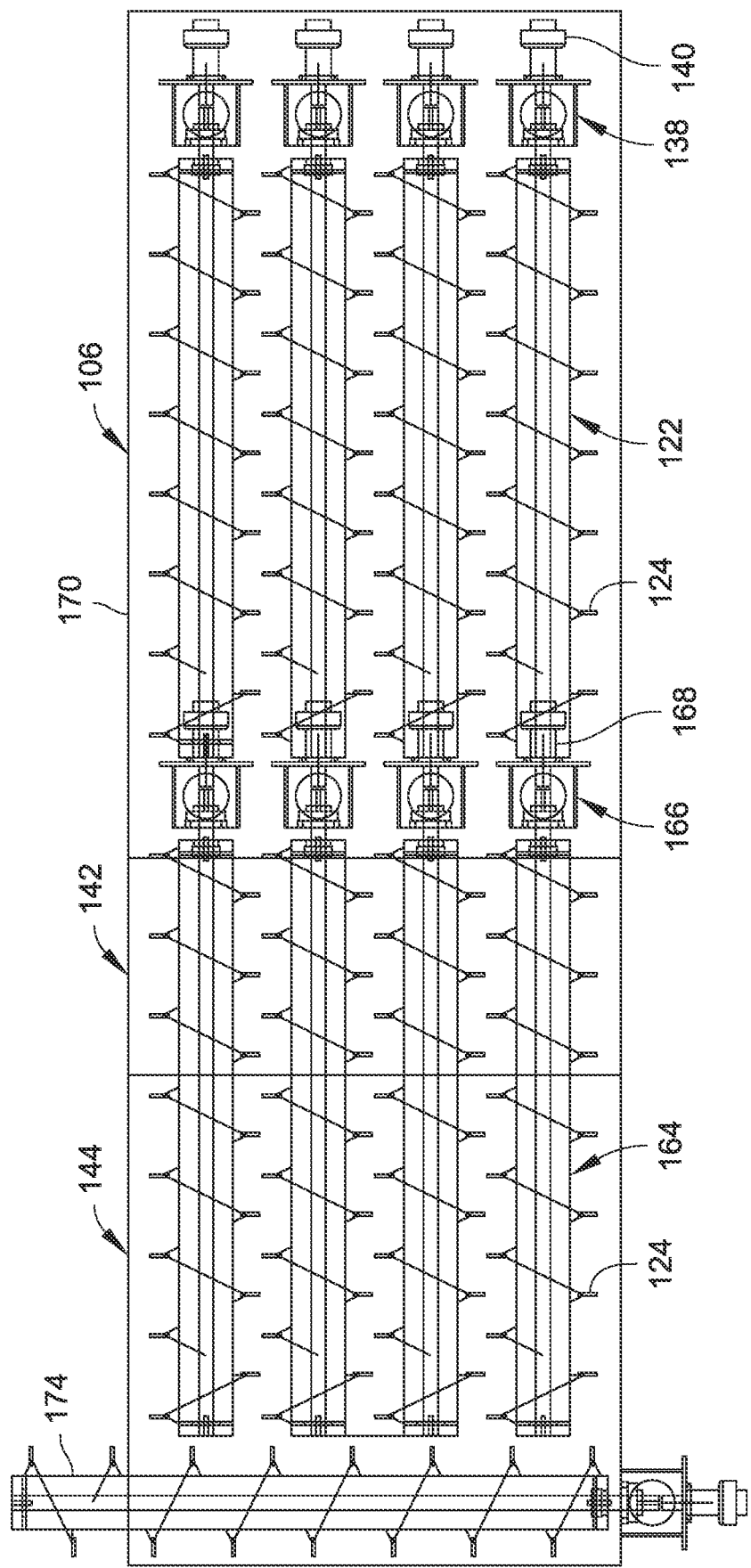
FIG. 2 is a top view of the conditioning zone, the reaction zone, the cooling zone, and the char removal auger illustrated in FIG. 1.

The augers (as shown in FIG. 2) lie side by side forming a live floor that moves material evenly across the length and width of the unit. A char removal auger 174 is also shown running transverse to the direction of the other augers. The fuel 102 and char 104 may be maintained at levels to prevent excess air from entering the unit.

There are two different methods of introducing air to the "reaction zone" (e.g., reaction zone 142). In this zone, a portion of the volatile carbon material and possibly some of the fixed carbon are oxidized to produce enough heat to drive off the volatiles in the rest of the biomass material 102. In some embodiments, approximately ¼ of the air required for complete oxidation is introduced into this zone, however, this amount may vary depending on conditions and biomass.

Most manure stock has materials that, at higher temperatures, can create "clinkers" (i.e., stony residue) or cause the biomass fuel to otherwise clump together and "snowball." To remedy this problem, air can be introduced with stationary multiple inlet points or by using a rotary air delivery system. Testing has shown that by keeping the air and the biomass fuel 102 moving, high-temperature zones (hotspots) can be avoided and reduce or eliminate crusting and/or agglomerate formation. A rotary air system may ensure that material can pass through this zone without problems. The combination of moving air and the disturbance to the biomass material 102 around the augers shown will continuously bring new material into and through the reaction zone 142. Keeping the air and biomass fuel 102 moving will generate considerable heat energy and a producer gas with high levels of CO (carbon monoxide) and H2 (dihydrogen) with other volatile compounds. This producer gas can then be used for various applications such as being fired in a low BTU (British Thermal Unit) turbine. Alternatively, the producer gas may be oxidized in a second chamber (e.g., oxidation chamber 162) to produce a high-temperature oxidized flue gas for use in downstream equipment such as boilers or hot oil heat exchangers.

The producer gas is directed to pass over the fuel 102 and is combined with the volatiles from the char cooling area (e.g., cooling zone 144) as well as the drying and conditioning areas (e.g., conditioning zone 106) of the gasifier. This process will transfer some of the heat down through the fuel 102 being introduced and help with the drying of the material before it reaches the air in the reaction zone 142. The resulting gas from the total process then transfers to a second chamber where the rest of the air required for complete oxidation is added or the gas can be cleaned for other applications. Alternative processes could include the catalytic oxidation of all or a portion of the producer gas. One key factor is that the biomass fuel flows in one direction while the producer gas flows in the opposite direction. This allows for the system to control the quality of the char, but also control the quality of the air emissions from the system.

In an embodiment, the temperature of the producer gas from the unit ranges from 500 to 900° C. (with upper ranges depending on the use of activated carbon fuel). In embodiments, the producer gas contains levels of CO, CO2 (carbon dioxide), and H2 as well as other compounds. When oxidized in the upper chamber the resulting flue gas may typically be in the 1000 to 1100° C. range. This flue gas can then be used for other energy applications.

The resulting char 104 is removed from the unit. The quantitative qualities of the char 104 can be adjusted to meet market demands by speeding up the flow or slowing it down, or adjusting the amount of air introduced into the various zones. When the char is cooled, relatively high levels of CO may be released. This will pass up over the gasifier reacting zone 142 as well as the fuel conditioning zone 106 to be added to the producer gas going to the oxidizer.

All aspects of the system may be controlled by a programmable logic controller. Feedback loops may be established based on gas and char temperatures at various points throughout the process. Automated adjustments may be made to the dwell time of the fuel in various zones of the process or in the amount of air introduced to maintain a consistent biochar.

Referring generally to FIGS. 1 through 17, gasification systems 100 for receiving biomass feedstock 102 and gasifying the biomass feedstock 102 to produce char 104 are described in accordance with example embodiments of the present disclosure. As described, a gasification system 100 includes a conditioning zone 106 for receiving biomass fuel 102 and preheating and/or drying the biomass fuel 102. In embodiments of the disclosure, the biomass fuel 102 can be organic matter used as fuel, such as carbonaceous fuel materials to be converted into gases.

The conditioning zone 106 includes a conditioning chamber 108 that defines a first live floor 110. The conditioning zone 106 also includes a drying volume 112 above the first live floor 110 and in fluid communication with the first live floor 110. In embodiments, the conditioning chamber 108 has a first end 114 for receiving the biomass fuel 102 on the first live floor 110 and a second end 116 for expelling the biomass fuel 102 from the first live floor 110. In some embodiments, the drying volume 112 above the first live floor 110 and in fluid communication with the first live floor 110 has a first roof height 118 proximate to the first end 114 of the first live floor 110 and a second roof height 120 proximate to the second end 116 of the first live floor 110. The second roof height 120 can be substantially less than the first roof height 118.

The conditioning zone 106 includes a first set of augers 122 arranged side-by-side within the conditioning chamber 108 on the first live floor 110. As described, each one of the first set of augers 122 has helical flighting 124 that extends longitudinally from the first end 114 of the conditioning chamber 108 to the second end 116 of the conditioning chamber 108. In embodiments, the helical flighting 124 of each auger 122 is turned in an opposing direction to each adjacent auger 122. For example, in reference to FIGS. 4-6 and 9, when viewed from a particular orientation, a first auger 122 has helical flighting 124 that turns clockwise, while each adjacent auger 122 (e.g., to the left and/or to the right of the first auger 122 from the same orientation) has helical flighting 124 that turns counterclockwise.

In some embodiments, the conditioning zone 106 includes a biomass bin 126 for accumulating biomass fuel 102 for processing and a fuel metering device 128 that regulates a flow rate of biomass fuel 102 carried by the first set of augers 122 from the biomass bin 128 to the conditioning chamber 108. The biomass bin 126 includes a first opening 130 for receiving the biomass fuel 102 and a second opening 132 that is in fluid communication with the first end 114 of the conditioning chamber 108. In embodiments, a portion of the first set of augers 122 pass through the second opening 132 of the biomass bin 126 and are located proximate to a bottom end 134 of the biomass bin 126 such that the biomass fuel 102 in the biomass bin 126 is gravitationally fed to the portion of the first set of augers 122 for transport to the conditioning chamber 108. In some embodiments, the fuel metering device 128 is a partition located between the reservoir bin 126 and the conditioning chamber 108 that controls a size of the second opening 132, therefore limiting the amount of biomass fuel 102 permitted to transport from the reservoir bin 126 based on the size of the second opening 132. Controlling the feed rate and retention time through a series of variable speed augers is a contributing factor into controlling where and how much air is supplied to react with the biomass fuel 102.

In embodiments, each one of the first set of augers 122 also has paddles 136 that intermittently interrupt the longitudinal extension of the helical flighting 124. When the gasification system 100 is operating and biomass 102 is received on the first live floor 110, the paddles 136 on the augers 122 turn over the biomass fuel 102 as the fuel is moved across the first live floor 110 by the first set of augers 122.

The conditioning zone 106 also includes a first auger drive unit 138 for driving the first set of augers 122 from the first end 114 of the conditioning chamber 108. For example, the first auger drive unit 138 includes one or more drive motors 140 for driving the first set of augers 122. As described, the first auger drive unit 138 is configured to drive the first set of augers 122 to push the biomass fuel 102 from the first end 114 of the conditioning chamber 108 to the second end 116 of the conditioning chamber 108. In embodiments, the first auger drive unit 138 is controllable to drive the first set of augers 122 to maintain a steady volume of the biomass fuel 102 within the conditioning chamber 108.

The gasification system 100 also includes a reaction zone 142 for receiving the conditioned biomass fuel 102 from the conditioning zone 106 and oxidizing the conditioned biomass fuel 102 to produce char 104. The gasification system 100 further includes a cooling zone 144 for receiving the char 104 from the reaction zone 142 and cooling the char 104. In embodiments, together the reaction zone 142 and the cooling zone 144 include a reaction chamber 146 and a cooling chamber 148, respectively, that define a second live floor 150. The reaction zone 142 and the cooling zone 144 also include a gas recovery volume 152 above the second live floor 150 and in fluid communication with the second live floor 150. In embodiments, the reaction chamber 146 and the cooling chamber 148 have a first end 154 for receiving the conditioned biomass fuel 104 on the second live floor 150 and a second end 156 for expelling the char 104 from the second live floor 150.

In some embodiments, the gasification system 100 includes a gas capture device 158 in fluid communication with the conditioning zone 106 for capturing gas 160 generated from the cooling zone 144 while cooling the char 104. As described, the gasification system 100 can include an oxidation chamber 162 in fluid communication with the drying volume 112 and the gas capture device 158 for oxidizing gas 160 (i.e., converting the producer gas that includes CO and H2 into $CO_2$ (carbon dioxide) and $H_2O$ (water vapor)) from the drying volume 112 and the captured gas 160 from the cooling chamber 148, where the oxidized gases are supplied to the conditioning zone 106 and heat is recovered from the oxidation chamber 162.

The reaction zone 142 and the cooling zone 144 include a second set of augers 164 arranged side-by-side within the reaction chamber 146 and the cooling chamber 148 on the second live floor 150. As described, each one of the second set of augers 164 has helical flighting 124 that extends longitudinally from the first end 154 of the reaction chamber 146 and the cooling chamber 148 to the second end 156 of the reaction chamber 146 and the cooling chamber 148. In embodiments, the helical flighting 124 of each auger 164 is turned in an opposing direction to each adjacent auger. For example, in reference to FIGS. 4-6 and 9, when viewed from a particular orientation, a first auger 164 has helical flighting 124 that turns clockwise, while each adjacent auger (e.g., to the left and/or to the right of the first auger from the same orientation) has helical flighting 124 that turns counterclockwise.

In embodiments, each one of the second set of augers 164 also has paddles 136 that intermittently interrupt the longitudinal extension of the helical flighting 124. When the gasification system 100 is operating and biomass 102 is received on the second live floor 150, the paddles 136 on the augers 164 turn over the biomass fuel 102 as the fuel is moved across the second live floor 150 by the second set of augers 164. In some embodiments, the diameter of each auger of the first set of augers 122 is at least substantially the same as the diameter of each auger of the second set of augers 164.

The reaction zone 142 and the cooling zone 144 also include a second auger drive unit 166 for driving the second set of augers 164 from the second end 156 of the reaction chamber 146 and the cooling chamber 148. For example, the second auger drive unit 166 includes one or more drive motors 168 for driving the second set of augers 164. As described, the second auger drive unit 166 is configured to drive the second set of augers 164 to pull the biomass fuel 102 from the first end 154 of the reaction chamber 146 and the cooling chamber 148 to the second end 156 of the reaction chamber 146 and the cooling chamber 148. In embodiments, the second auger drive unit 166 is controllable to drive the second set of augers 164 to maintain a steady volume of the biomass fuel 102 within the reaction chamber 146 and the cooling chamber 148.

The gasification system 100 further includes a reaction zone wall 170 disposed between the reaction zone 142 and the cooling zone 144 for restricting the flow of char 104 from the reaction zone 142 to the cooling zone 144. The gasification system 100 can also include an air introduction device 172 (e.g., an air handling unit such as a blower, a fan, etc.) in fluid communication with the reaction zone 142 above the second live floor 150. As described, the gasification system 100 can also include a char removal auger 174 for removing the char 104 from the cooling zone 144, where the char removal auger 174 is arranged in a transverse orientation with respect to the second set of augers 164. In some embodiments, the second set of augers 164 extends over the char removal auger 174. As described, the char removal auger 174 is coupled to a drive unit for driving the auger. In embodiments, the drive unit includes one or more drive motors.

In embodiments, one or more walls, surfaces, partitions, and floors of each chamber and/or zone of the gasification system include refractory paneling 176 that are composed of heat-resistant materials (e.g., brick, motar, ceramics, refractory metals, etc.) so as to prevent structural warping due to high temperatures throughout the gasification system.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A gasification system for receiving biomass feedstock and gasifying the biomass feedstock to produce char, the gasification system comprising:
   a conditioning zone for receiving biomass fuel and at least one of preheating or drying the biomass fuel, the conditioning zone including:
      a conditioning chamber defining a first live floor and a drying volume above the first live floor and in fluid communication with the first live floor, the conditioning chamber having a first end for receiving the biomass fuel on the first live floor and a second end for expelling the biomass fuel from the first live floor,
      a first plurality of augers arranged side-by-side within the conditioning chamber on the first live floor, each one of the first plurality of augers having:
         helical flighting extending longitudinally from the first end of the conditioning chamber to the second end of the conditioning chamber, the helical flighting turned in an opposing direction to each adjacent one of the first plurality of augers, and
         a plurality of paddles intermittently interrupting the longitudinal extension of the helical flighting for turning over the biomass fuel as the biomass fuel is moved across the first live floor by the first plurality of augers,
      a first auger drive unit for driving the first plurality of augers from the first end of the conditioning chamber, the first auger drive unit configured to drive the first plurality of augers to push the biomass fuel from the first end of the conditioning chamber to the second end of the conditioning chamber, the first auger drive unit controllable to drive the first plurality of augers to maintain a steady volume of the biomass fuel within the conditioning chamber;
   a reaction zone for receiving the conditioned biomass fuel from the conditioning zone and oxidizing the conditioned biomass fuel to produce char;
   a cooling zone for receiving the char from the reaction zone and cooling the char, the reaction zone and the cooling zone together including:
      a reaction chamber and a cooling chamber defining a second live floor and a gas recovery volume above the second live floor and in fluid communication with the second live floor, the reaction chamber and the cooling chamber having a first end for receiving the conditioned biomass fuel on the second live floor and a second end for expelling the char from the second live floor,
      a second plurality of augers arranged side-by-side within the reaction chamber and the cooling chamber on the second live floor, each one of the second plurality of augers having:
         helical flighting extending longitudinally from the first end of the reaction chamber and the cooling chamber to the second end of the reaction chamber and the cooling chamber, the helical flighting turned in an opposing direction to each adjacent one of the second plurality of augers, and
         a plurality of paddles intermittently interrupting the longitudinal extension of the helical flighting for turning over the biomass fuel as the biomass fuel is moved across the second live floor by the second plurality of augers,
      a second auger drive unit for driving the second plurality of augers from the second end of the reaction chamber and the cooling chamber, the second auger drive unit configured to drive the second plurality of augers to pull the biomass fuel from the first end of the reaction chamber and the cooling chamber to the second end of the reaction chamber and the cooling chamber, the second auger drive unit controllable to drive the second plurality of augers to maintain a steady volume of the biomass fuel within the reaction chamber and the cooling chamber; and a reaction zone wall disposed between the reaction zone and the cooling zone for restricting the flow of char from the reaction zone to the cooling zone.

2. The gasification system as recited in claim 1, wherein the first plurality of augers and the second plurality of augers have the same diameter.

3. The gasification system as recited in claim 1, further comprising a char removal auger for removing the char from the cooling zone, wherein the char removal auger is arranged in a transverse orientation with respect to the second plurality of augers, and the second plurality of augers extends over the char removal auger.

4. The gasification system as recited in claim 1, wherein the drying volume above the first live floor and in fluid communication with the first live floor has a first roof height proximate to the first end of the first live floor and a second roof height proximate to the second end of the first live floor, and where the second roof height is substantially less than the first roof height.

5. The gasification system as recited in claim 1, further comprising an air introduction device in fluid communication with the reaction zone above the second live floor.

6. The gasification system as recited in claim 1, wherein the conditioning zone includes a fuel metering device.

7. The gasification system as recited in claim 1, further comprising a gas capture device in fluid communication with the conditioning zone for capturing gas generated from the cooling zone while cooling the char.

8. The gasification system as recited in claim 7, further comprising an oxidation chamber in fluid communication with the drying volume and the gas capture device for oxidizing gas from the drying volume and the captured gas from the cooling chamber and oxidizing the gases, wherein the oxidized gases are supplied to the conditioning zone and heat is recovered from the oxidation chamber.

9. A gasification system for receiving biomass feedstock and gasifying the biomass feedstock to produce char, the gasification system comprising:
a reaction zone for receiving biomass fuel and oxidizing the biomass fuel to produce char;
a cooling zone for receiving the char from the reaction zone and cooling the char, the reaction zone and the cooling zone together including:
a reaction chamber and a cooling chamber defining a live floor and a gas recovery volume above the live floor and in fluid communication with the live floor, the reaction chamber and the cooling chamber having a first end for receiving the biomass fuel on the live floor and a second end for expelling the char from the live floor, and
a plurality of augers arranged side-by-side within the reaction chamber and the cooling chamber on the live floor, each one of the plurality of augers having helical flighting extending longitudinally from the first end of the reaction chamber and the cooling chamber to the second end of the reaction chamber and the cooling chamber, the helical flighting turned in an opposing direction to each adjacent one of the plurality of augers, the plurality of augers including a plurality of paddles intermittently interrupting the longitudinal extension of the helical flighting for turning over the biomass fuel as the biomass fuel is moved across the live floor by the plurality of augers; and
a reaction zone wall disposed between the reaction zone and the cooling zone for restricting the flow of char from the reaction zone to the cooling zone.

10. The gasification system as recited in claim 9, further comprising an auger drive unit for driving the plurality of augers from the second end of the reaction chamber and the cooling chamber, the auger drive unit configured to drive the plurality of augers to pull the biomass fuel from the first end of the reaction chamber and the cooling chamber to the second end of the reaction chamber and the cooling chamber.

11. The gasification system as recited in claim 10, wherein the auger drive unit is controllable to drive the plurality of augers to maintain a steady volume of the biomass fuel within the reaction chamber and the cooling chamber.

12. The gasification system as recited in claim 9, further comprising a char removal auger for removing the char from the cooling zone, wherein the char removal auger is arranged in a transverse orientation with respect to the plurality of augers, and the plurality of augers extends over the char removal auger.

13. The gasification system as recited in claim 9, further comprising an air introduction device in fluid communication with the reaction zone above the live floor.

14. A gasification system for receiving biomass feedstock and gasifying the biomass feedstock to produce char, the gasification system comprising:
a reaction zone for receiving biomass fuel and oxidizing the biomass fuel to produce char;
a cooling zone for receiving the char from the reaction zone and cooling the char, the reaction zone and the cooling zone together including:
a reaction chamber and a cooling chamber defining a live floor and a gas recovery volume above the live floor and in fluid communication with the live floor, the reaction chamber and the cooling chamber having a first end for receiving the biomass fuel on the live floor and a second end for expelling the char from the live floor, and
a plurality of augers arranged side-by-side within the reaction chamber and the cooling chamber on the live floor, each one of the plurality of augers having:
helical flighting extending longitudinally from the first end of the reaction chamber and the cooling chamber to the second end of the reaction chamber and the cooling chamber, and
a plurality of paddles intermittently interrupting the longitudinal extension of the helical flighting for turning over the biomass fuel as the biomass fuel is moved across the live floor by the plurality of augers; and
a reaction zone wall disposed between the reaction zone and the cooling zone for restricting the flow of char from the reaction zone to the cooling zone.

15. The gasification system as recited in claim 14, wherein the helical flighting of each one of the plurality of augers is turned in an opposing direction to each adjacent one of the plurality of augers.

16. The gasification system as recited in claim 14, further comprising an auger drive unit for driving the plurality of augers from the second end of the reaction chamber and the cooling chamber, the auger drive unit configured to drive the plurality of augers to pull the biomass fuel from the first end of the reaction chamber and the cooling chamber to the second end of the reaction chamber and the cooling chamber.

17. The gasification system as recited in claim 16, wherein the auger drive unit is controllable to drive the plurality of augers to maintain a steady volume of the biomass fuel within the reaction chamber and the cooling chamber.

18. The gasification system as recited in claim 14, further comprising a char removal auger for removing the char from the cooling zone, wherein the char removal auger is arranged in a transverse orientation with respect to the plurality of augers, and the plurality of augers extends over the char removal auger.

19. The gasification system as recited in claim 14, further comprising an air introduction device in fluid communication with the reaction zone above the live floor.

* * * * *